Dec. 1, 1942.  C. A. LOVELL  2,303,564
ALTERNATING CURRENT GENERATOR
Filed May 21, 1941

INVENTOR
C. A. LOVELL
BY
ATTORNEY

Patented Dec. 1, 1942

2,303,564

UNITED STATES PATENT OFFICE 2,303,564

ALTERNATING CURRENT GENERATOR

Clarence A. Lovell, Maplewood, N. J., assignor to Bell Telephone Laboratories, Incorporated, New York, N. Y., a corporation of New York Application May 21, 1941, Serial No. 394,461

1 Claim. (Cl. 179—90)

This invention relates to signaling means and particularly to alternating current generators of the type used in telephone for generating alternating current dialing signals representing telephone station designations.

The object of the invention is to provide an efficient reed generator of small dimensions. In this general class of minute alternating current generators of simple construction it is necessary to produce a device of rugged nature for subscriber manipulation and which will nevertheless be extremely accurate in its operation. The generator belongs in the class of reed generators in which a reed designed to have a particular natural period of vibration corresponding to the frequency of the alternating current needed for signals is plucked and through its vibration causes the transmission of the desired signal. The most common type of such a generator comprises a magnetic circuit interlinked with a pick-up coil whereby when the reed is set into vibration by being plucked will through such vibration alter the conditions in such magnetic circuit and cause an alternating current to be induced in said pick-up coil.

In such generators it is usual to employ a plurality of such reeds each of a different dimension whereby a plurality of alternating currents of different frequencies may be generated and which may be transmitted either singly or in combination and in permutation codes representing different telephone designations. Energy is supplied by a permanent magnet in the said magnetic circuit and when the polarizing flux supplied by this permanent magnet is modulated by the vibration of the reed the pick-up coil interlinked with the magnetic circuit has induced in it a given frequency alternating current. Where the permanent magnet is made of one piece as for instance in the form of a solid horseshoe magnet the losses due to hysteresis and eddy currents may be large. The eddy current loss may be cut by laminating the magnet in well-known manner but the hysteresis loss depending on the properties of the permanent magnetic material employed cannot be readily avoided. In small dimensioned apparatus of this nature it is essential that every means for promoting efficiency must be employed and hence this hysteresis loss is regarded as serious. It is, therefore, an object of the present invention to provide a reed generator having no hysteresis loss and this object is attained by using electrostatic rather than electromagnetic means.

In accordance with the present invention a plurality of reeds each tuned to a different frequency are employed for transmitting correspondingly different signals. These reeds each form one electrode of a pair, the other of which is stationary. When a reed is plucked or otherwise set in vibration the electrostatic coupling between such pair of electrodes is changed and thereupon translated into a signal which may be transmitted over a line for various useful purposes.

In accordance with one form of the invention a local polarizing battery is used and the two electrodes thus electrostatically coupled being connected to the terminals of such battery will, upon vibration of the reed, generate an alternating current of the same frequency as that of the reed.

In accordance with another form of the invention an electrostatic reed generator is used in association with a vacuum tube circuit whereby polarization by the central office battery may be employed.

A feature of the invention is a variable condenser one of whose electrodes is a reed having a given natural period of vibration.

Another feature is a variable condenser one of whose electrodes comprises a plurality of tuned reeds which may be selectively set in vibration.

Another feature of the invention is the combination in a communication system of a variable condenser which may be selectively varied at a rate corresponding to the frequency of desired signals, together with a polarizing circuit including a vacuum tube.

Another feature is a high impedance alternating current generator comprising essentially a variable condenser one of whose electrodes consists of a plurality of reeds each having a different natural period of vibration.

Other features will appear in the following description.

The drawing consists of a single sheet having four figures as follows.

Figure 1:
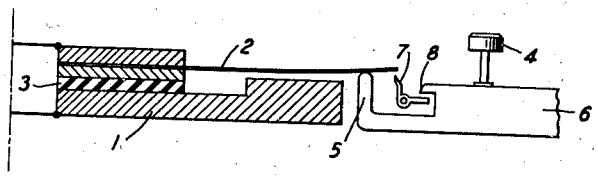
Fig. 1 is a cross-sectional view through one of the reeds of a generator with a schematic representation of the means employed for plucking the reed.

The alternating current generator of the present invention consists essentially of a metallic base portion 1 and a number of reeds 2, 3, 4, 5 and 6. Each of these reeds, such as reed 2 shown in Fig. 1, lies close to the base portion 1 so that the reed 2 and the base portion 1 form plates of a condenser. When the reed is caused to vibrate the capacity of this condenser changes so as to produce at the terminals thereof an alternating current of the same frequency as the natural period of vibration of the reed. The reeds and the base plate 1 are divided or insulated from each other by a piece of insulation 3. Each of the reeds 2, 3, 4, 5 and 6 respectively is tuned to a different natural period of vibration as indicated in Fig. 2 by being of different lengths.

Figure 2:
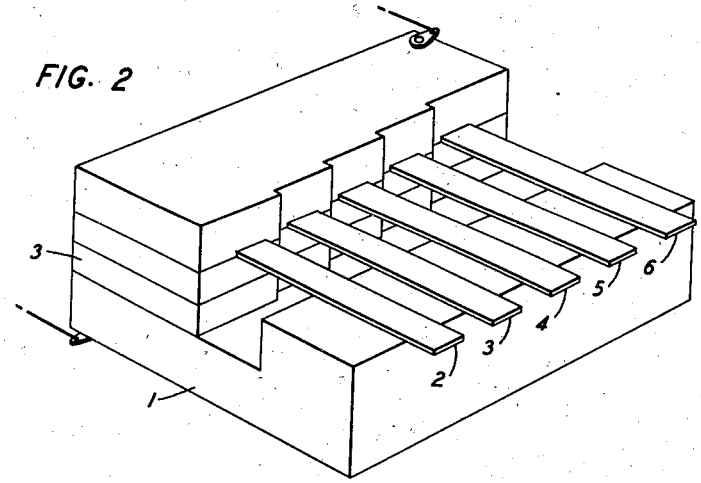
Fig. 2 is a perspective view of the generator of the present invention.

In Fig. 1 a means for causing the reed to vibrate is indicated by the key 4. This is a schematic representation of the means employed in similar apparatus such, for instance, as that shown in Patent 2,147,710 granted February 21, 1939, to R. F. Mallina. The reed 2 is normally stressed upwardly as shown in Fig. 1 by a finger 5 forming part of the button lever 6 under the influence of a spring. When the key 4 is depressed the finger 5 is withdrawn from the reed whose end thereupon comes into contact with a pawl 7 which prevents further movement of the reed 2. As the button lever 6 is further depressed a finger 8 comes in contact with the pawl 7 and by causing this pawl to rotate in a clockwise direction snaps away from the end of the reed and allows it to freely vibrate.

As clearly shown in the above-noted Mallina patent these various reeds may be plucked in different combinations for the purpose of transmitting alternating currents of different frequencies over telephone lines to control apparatus at the distant ends thereof.

Figure 3:
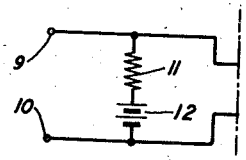
Fig. 3 is a circuit diagram showing the connections between the mechanical elements of the generator and the output circuit thereof.

The manner in which the varying capacities of the condenser formed by the base plate 1 and the reed 2 may be usefully employed in producing a like frequency alternating current is a matter of engineering choice. Fig. 3 indicates one method by which this can be done. The terminals of the generator 1 may be connected to the telephone line as indicated by the numerals 9 and 10. Either the reed side or the fixed plate side of the variable condenser may be grounded as desired. Suitable insulation between the fixed plate and plucking device or between the plucker and reed is necessary. The wires extending to the right of the dot-and-dash line are to be connected up to the terminals of the generator. Between the conductors connected to the terminals 9 and 10 there will be a resistance 11 and a battery 12. This will place a normal charge on the plates of the condenser which will remain static as long as the reed is not in movement. When, however, the reed is caused to vibrate the variation in the capacity of the condenser will vary the potential across the terminals 9 and 10 and in turn will act to transmit an alternating current of the desired frequency into the circuit of the telephone line.

Figure 4:
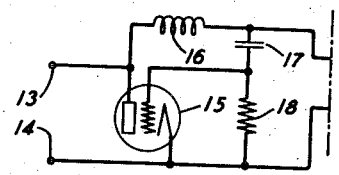
Fig. 4 shows an alternative circuit arrangement for the same purpose.

In Fig. 4, an alternative circuit arrangement is shown. The terminals of the device are therein designated 13 and 14 and between these points and the connections to the reed and the base plate there will be connected a vacuum tube 15 in a network with an inductance 16, a condenser 17, and a resistance 18. The condenser 17 will be charged normally to the potential existing across the terminals 13 and 14 by the line current. When the reed is caused to vibrate however the condenser formed of the reed and the base plate of the generator will vary the charge across the condenser 17 and the resistance 18 in such a manner that the tube 15 is affected and the alternations caused by the vibrations of the reed will be amplified by the tube 15 so that an alternating current will appear at the terminals 13 and 14 which will be of sufficiently great strength for practical use.

What is claimed is:

In a signaling system, a signal transmitter comprising a variable condenser comprising a plurality of reeds of resilient conducting material forming one plate thereof and a stationary base member forming the other plate thereof, said reeds being of different length and each having a different natural period of vibration, said reeds being secured to a stepped anchorage secured to said base member, insulation fixed between said anchorage and said base member, said base member being formed with a surface near the free ends of said reeds whereby maximum variation in the capacity of said condenser is produced during the free vibration of said reeds, mechanical means for plucking said reeds, and condenser terminals attached to said anchorage and said base member for connection to a signaling channel.

CLARENCE A. LOVELL.